United States Patent [19]
Domenighetti

[11] 3,861,196
[45] Jan. 21, 1975

[54] APPARATUS FOR MEASURING IN SITU THE PERMEABILITY OF A CIVIL ENGINEERING WORKING STRATUM

[76] Inventor: Domenico Domenighetti, Via Nosetto 6, 6500 Bellinzona, Switzerland

[22] Filed: June 26, 1973

[21] Appl. No.: 373,901

[30] Foreign Application Priority Data
July 3, 1972 Switzerland.......................... 9960/72

[52] U.S. Cl. .................................... 73/38, 277/34.3
[51] Int. Cl. ............................................ G01n 15/08
[58] Field of Search .................. 73/38; 277/34.3, 34

[56] References Cited
UNITED STATES PATENTS
| | | | |
|---|---|---|---|
| 2,345,935 | 4/1944 | Hassler | 73/38 |
| 2,676,485 | 4/1954 | Morgan | 73/38 |
| 3,548,635 | 12/1970 | Hutchinson et al. | 73/38 |

FOREIGN PATENTS OR APPLICATIONS
93,494  5/1962  Denmark .......................... 277/34.3

Primary Examiner—Richard C. Queisser
Assistant Examiner—Daniel M. Yasich
Attorney, Agent, or Firm—Young & Thompson

[57] ABSTRACT

The permeability of a flat surface is measured, by pressing down on the surface a central chamber surrounded by an annular chamber. The chambers are open at their bottom, and in the annular chamber is disposed a flexible annular bladder. Air is pumped into the bladder to seal about the central chamber, and then liquid under a predetermined pressure is introduced into the central chamber. The pressure of the liquid is no greater than the pressure of the air in the annular chamber and so the liquid does not leak out laterally. The flow rate of liquid into the central chamber thus indicates the permeability of the subjacent material.

6 Claims, 2 Drawing Figures

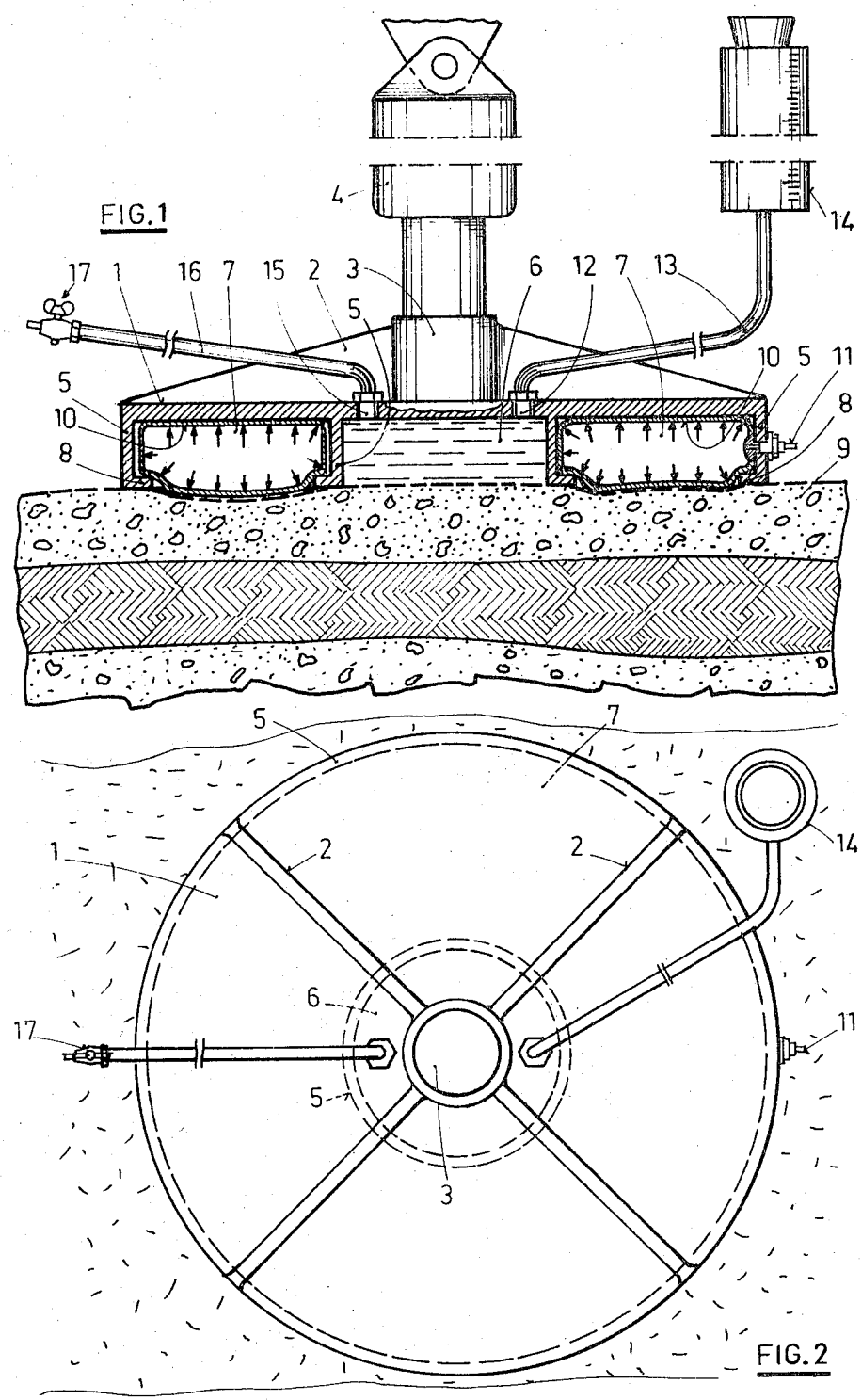

APPARATUS FOR MEASURING IN SITU THE PERMEABILITY OF A CIVIL ENGINEERING WORKING STRATUM

It is known that for measuring the permeability of civil engineering work strata such as road paving in bituminous conglomerate there has been adapted a system of taking out a core or plug, inserting it into a tube, which preferably is transparent and has the same material diameter as the diameter of the core or plug and a length sufficient to be able to establish in this tube a "head" of liquid above the core or plug. The time taken for a predetermined quantity of liquid to pass through the core and/or the quantity of liquid which passes through the core in a given time are/is a measure of the permeability of the material of the core. This known system has drawbacks due to the necessity of removing the core and sealing the core periphery to the interior of the tube, which operation is expensive and laboriously time consuming.

The present invention has as an object to provide a new method and apparatus for measuring "in situ," the quantity of a liquid e.g., water which passes through, in a unit of time, from one part to the other of a predetermined stratum of material. The stratum may be of board covered in bituminous conglomerate, a dyke wall or a swimming pool and the like.

According to the invention, the apparatus comprises a central chamber adapted to hold measuring liquid under pressure, said chamber being surrounded by an annular chamber in which is contained a fluid, for example a gas, at a normal pressure or greater than the pressure of the liquid in the central chamber. The fluid contained in the annular chamber prevents the liquid contained in the central chamber from flowing outwardly of the central chamber along the surface of the stratum zone to be measured and the measuring fluid is compelled to penetrate the stratum and flow through it behaving as the water would behave and the other fluids to which the stratum in question must be impermeable. In the method of the invention, measuring fluid is retained in a central chamber by an annular chamber containing a fluid at a pressure equal to or greater than the maximum pressure of the measuring fluid in the central chamber, and there are means for introducing the measuring fluid into the central chamber and means for introducing fluid into the annular chamber.

An embodiment of the invention will now be described, by way of example, with reference to the accompanying drawing, wherein;

FIG. 1 shows in elevation and in partial section, one embodiment of the apparatus according to the invention; and FIG. 2 is a plan view of the apparatus shown in FIG. 1.

The apparatus shown in the drawings comprises a strong circular plate 1 provided with strengthening reinforcements 2, for example in the form of radial ribs which merge into a central boss 3 disposed in central position of plate 1, on which central region is exercised a force perpendicular to the plate 1, for example by means of a hydraulic hammer or ram 4. On the other face of the plate 1 are mounted concentric inner and outer walls 5 which in the drawing have a circular shape and which define a central chamber 6 and an annular chamber 7. The walls 5 terminate at the same distance from plate 1 and have extensions 8 which are parallel to plate 1 and by which the apparatus is supported on the surface of the stratum 9 whose permeability it is desired to measure.

In the annular chamber 7 there is a toroidal bladder 10 made of flexible and/or elastic material, such bladder 10 being provided with a valve 11 by which the bladder may be inflated to the desired pressure.

The central chamber 6 is provided with an inlet orifice 12 through which, by means of the tubing 13 and the graduated vessel 14, the measuring fluid, which will usually be water, is introduced.

Through a second orifice 15 leading to the central chamber and by means of another tubing 16 controlled by a tap 17, the air may be evacuated from the central chamber as it is being filled with liquid.

In order to carry out a measurement of permeability the extensions 8 are made to contact the surface of the stratum 9 to be measured, then an adequate force is exercised on the boss 3 by means of the hammer 4 or other equivalent means to press such extensions firmly to the surface.

Subsequently, fluid is introduced under pressure through the valve 11 so as to inflate the bladder 10 which expands inside the annular chamber 7 pressing firmly to its wall and in particular pressing firmly to the surface of the stratum 9 around the region whose permeability it is desired to measure. The circular area of contact between the bladder 10 and the surface of the stratum 9 may be previously treated with lubricating grease, butumin or other similar composition which closes the pores and at the same time allows the bladder 10 to adapt itself to the surface irregularity of the stratum 9. When the pressure contained in the bladder 10 has reached a predetermined value there is introduced into the central chamber 6 the measuring fluid. This fluid is introduced through the tubing 13 from the measuring vessel 14. In order to ensure that the central chamber 6 is completely filled liquid is charged into the chamber with the tap 17 open until measuring liquid flows out of tap 17, at which stage the tap is closed.

In order to put the measuring fluid contained in the chamber 6 under pressure so as to accelerate its penetration into the stratum 9 the permeability of which it is desired to measure, it will suffice to raise the measuring vessel 14 making use of the flexibility of the tubing 13 so as to create a certain difference of level between the surface of the stratum 9 which comes in contact with the measuring fluid and the "free surface" of the said measuring fluid in the graduated vessel 14.

Generally, the measuring process is considered initiated at the moment when the measuring liquid in the inside of the central chamber 6 is at increased pressure. At this moment, there are carried out successive readings and at regular intervals of time, of the levels which the measuring liquid assumes inside the graduated vessel to determine the quantity of fluid which is passing through the stratum per unit of time.

On the basis of an examination of this rate of flow it will be possible to judge regarding the greater or lesser permeability of the stratum 9.

I claim:

1. Apparatus for measuring the permeability of a planar surface, comprising wall means defining a downwardly opening central chamber, means to supply a fluid into said central chamber, means connected to said fluid supplying means for measuring the fluid flow rate with respect to time, means spaced from said central chamber wall means defining an annular chamber lined with a flexible bladder and surrounding said central chamber, means for separately introducing into said annular chamber a fluid under a preselected pressure for sealing off said central chamber against said planar surface, and means for holding the wall means defining said central and annular chambers against said planar surface in opposition to the pressure in said annular chamber.

2. Apparatus as claimed in claim 1, said bladder being downwardly exposed to said planar surface.

3. Apparatus as claimed in claim 1, said means for supplying fluid to said central chamber comprising a graduated vessel and flexible tubing connecting said graduated vessel to said central chamber.

4. Apparatus as claimed in claim 1, and an outlet conduit from said central chamber with a control valve in said outlet conduit.

5. Apparatus as claimed in claim 1, comprising a rigid horizontal plate forming said wall and spaced wall means and having downwardly depending annular walls, said flexible bladder in said annular chamber being laterally confined by and downwardly open between said walls.

6. A method for measuring the permeability of a planar surface, comprising positioning over said surface, a downwardly open central chamber surrounded by a rigid horizontal plate having a downwardly open annular chamber lined by a flexible bladder, selectively applying pressure to the plate, introducing into said annular chamber fluid under a preselected pressure to seal against said planar surface while restraining upward movement of said chambers, selectively introducing a fluid to be measured into said central chamber, continuously supplying further fluid to said central chamber, and measuring the flow rate of fluid with respect to time into central chamber as a measure of the permeability of the planar surface below said central chamber.

* * * * *